Figure 1:
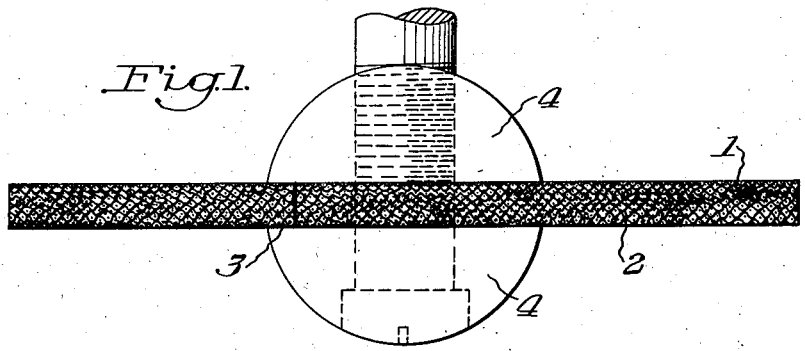

Feb. 3, 1942.  R. L. WAKEMAN  2,271,961

LIQUID METER PISTON

Filed Oct. 14, 1939

INVENTOR
Reginald L. Wakeman.
BY
Lewis D. Kniggford
ATTORNEY

Patented Feb. 3, 1942

2,271,961

UNITED STATES PATENT OFFICE 2,271,961

LIQUID METER PISTON

Reginald L. Wakeman, Pittsburgh, Pa., assignor to Pittsburgh Equitable Meter Company, Pittsburgh, Pa., a corporation of Pennsylvania Application October 14, 1939, Serial No. 299,533

4 Claims. (Cl. 121—69.5)

The present invention relates to liquid meters. In particular, it relates to the construction and manufacture of pistons for water meters which will withstand either cold or hot water, so that they may be employed for both cold and hot water services or for services where they are occasionally subjected to hot water.

Pistons of water meters ordinarily in use are constructed of hard rubber in which a suitable filler is incorporated. Material of this type possesses a satisfactory density, as well as other desirable properties. Such pistons have been found generally satisfactory for measuring cold water, but owing to the nature of the rubber, they soften, swell or warp in hot water in which, therefore, they cannot be used. Thus, when hot water accidentally backs into the cold water pipes in a dwelling, the piston of the meter may be damaged sufficiently to require the insertion of a new piston. The damage from such an accident may sometimes not be sufficient to stop the meter, but may simply affect its accuracy. In such a case, false registration occurs until the error is discovered, which may only be after a long period of time.

Attempts have previously been made to construct water meter pistons of materials that will withstand hot water, but such attempts have not been successful, for the reason that no materials have heretofore been found which possess low density and other desirable properties of hard rubber and which, at the same time, are capable of withstanding hot water. It has been proposed to make the piston of metal, but such pistons have not been satisfactory because of their high density, which reduces the accuracy of the meter at low rates of flow. Baked graphite pistons have also been proposed, but have not proven satisfactory because of their excessive brittleness, which causes them to be easily broken in service.

There are at present commercially available a large variety of plastics and resins of various types, and my investigation has shown that a large number of them employed with or without various fillers are not suitable for making water meter pistons. I have found, however, that a laminated thermosetting phenolic resin incorporating a base material which is in the form of a cohesive sheet is suitable for making water meter pistons that are subjected to hot or cold water. It has been found that thermosetting phenolic resins in the pure state undergo a considerable volume change or swelling when immersed in water, and the addition of a comminuted filler does not appreciably change this property. For this reason it could not be foreseen that by employing certain laminated base materials a composition suitable for water meter pistons could be produced. While this swelling cannot be prevented, it is my theory that the cohesive sheet of laminated base material controls the direction of swelling so as to hold the swelling in the plane of the laminations to a minimum, or sufficiently low so that the swelling is within the range of tolerance provided in the meter. Due to the flowability of the resin, the piston is not warped by the restricting force of the laminated base and expands uniformly in thickness. This increase in thickness, however, is also within the tolerances provided in the meter. A further characteristic of such pistons is that although a slight swelling takes place when the piston is first immersed in water, the swelling in the plane of the laminations stops within a few days and the swelling in thickness stops within a slightly longer time. Thereafter the dimensions of the piston are substantially stabilized. This initial swelling is not enough to interfere with or appreciably affect the operation of the meter when first placed in service. The piston then may be considered as substantially saturated and will not swell further or warp or distort in service, even when exposed to hot water. The extent and duration of the initial swelling will depend to some extent on the nature or cohesiveness of the laminating base material, and upon the proportion of resin to base in the composition.

As examples of suitable fillers or base materials resistant to hot water, I mention the group comprising asbestos paper, asbestos felt, woven asbestos cloth, glass fibre felt, woven glass fibre cloth, and felt and cloth made of water repellent synthetic fibres such as those of the polyvinyl type or those of the condensed aliphatic polybasic acid-polyamine type, for example, "Vinyon" and "Nylon" respectively. Asbestos yarn commercially available frequently contains a small proportion of cotton fibre added to assist in the spinning process, but in general the proportion is so small as to produce no appreciable undesired effect. If preferred, the asbestos yarn may be reenforced with a small proportion of synthetic water repellent fibre, or with a few strands of corrosion resistant metal wire in place of part or all of the cotton generally employed. In general, the presence of cellulose pulp in asbestos paper is not desirable, but small quantities, such as are frequently present in commercial grades of asbestos paper, may be present without producing excessive transverse swelling of the piston. In certain instances, such as when the base material employed is woven asbestos cloth, any tendency toward unequal swelling in the plane of the laminations may be overcome by employing a fabric of uniform structure, or by varying the direction of the warp in successive laminations.

Laminated thermosetting phenolic resins incorporating base materials which I have found suitable for water meter pistons are commercially available in sheet form under various trade names, and the pistons may be cut from such sheets. Of, if desired, the pistons may be molded under heat and pressure from resin-impregnated sheets of base material cut to approximately their final size prior to molding, and afterward the piston may be trimmed or machined to final dimensions.

Figure 2:
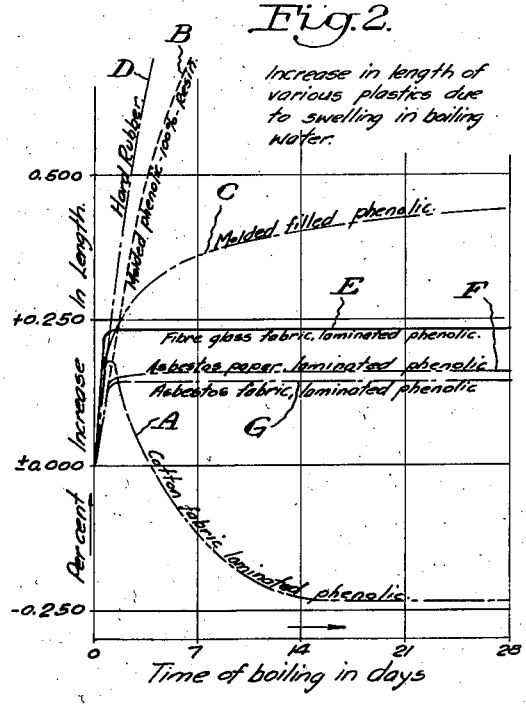
Figure 3:
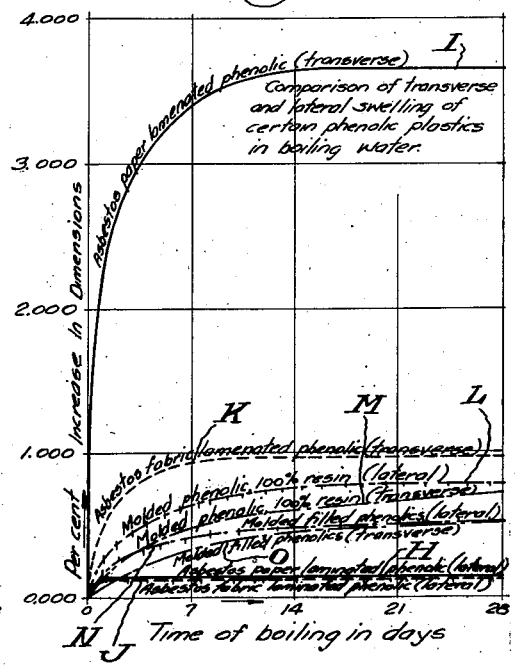

The invention will be explained in further detail with reference to the accompanying drawing showing a preferred embodiment of the invention by way of example, and wherein:

Figure 1 illustrates a preferred embodiment of a water meter piston made in accordance with my invention, Figure 2 is a diagram illustrating characteristic lateral swelling curves for sheets of thermosetting phenolic resins incorporating various fillers or base materials, and Figure 3 shows characteristic curves for both transverse and lateral swelling of thermosetting phenolic resins with and without fillers.

The following specific example illustrates one method of manufacture of water meter pistons from raw materials.

A suitable proportion of an aqueous formaldehyde solution and of phenol or common cresylic acid, preferably free from or containing only negligible amounts of ortho-cresol, are reacted in a manner known in the art, preferably in the presence of an ammoniacal base type catalyst, such as concentrated ammonium hydroxide or an organic amine, to form a condensation product. Water and excess aldehyde are then removed by application of a vacuum, the temperature of the batch being carefully controlled to prevent excess condensation. The resultant product is then diluted with alcohol to an optimum density. Sheets of woven asbestos cloth then are impregnated with the resulting solution and dried in an oven below the thermosetting temperature. A plurality of layers of the impregnated woven asbestos cloth are then superposed, the number of layers used depending on the final thickness desired, and are molded in a hydraulic press at about 1500 pounds per square inch, being simultaneously heated to about 170° C. until cured, and then allowed to cool in the press. The resulting sheet is subsequently removed from the press and may be cut into pistons of the desired size and shape such, for example, as the disc illustrated in Figure 1.

If desired, the water meter piston may be molded directly by superposing a plurality of layers of the impregnated asbestos cloth, cut to suitable size and shape, in a mold having approximately the final desired shape and subjecting the material to heat and pressure as described above. The piston is then removed from the mold and is machined or trimmed to final dimension.

It will be understood that one or more layers of the base material may be employed. In place of asbestos cloth in the above example, any of the base materials herein named may be used. In using asbestos felt, the felt may be preformed, or a mat of fibres may be employed, the felting being carried out simultaneously with the molding operation. The invention is not limited to phenol-formaldehyde resins, as thermosetting resins of formaldehyde and any suitable phenol, or of any other suitable aldehyde, for example, furfural and any suitable phenol, may be employed in a similar manner.

Referring to Figure 2, I have shown typical curves representing the lateral swelling of phenol-formaldehyde resins containing various base or filler materials. Thus, curve A, representing a resin with a cotton fabric lamination, shows that such material expands slightly when first immersed in boiling water and then shrinks, the expansion and shrinking being within a rather wide range. Curve B represents a molded phenol-formaldehyde resin containing no filler or base material, and it will be seen that the swelling of this material continues rather sharply for a relatively long period of time, and closely resembles the curve for hard rubber shown at D. Curve C, which represents a molded phenol-formaldehyde resin containing a comminuted filler, shows somewhat improved characteristics, but the swelling still takes place over a relatively long period of time and is relatively great. Curves E, F and G represent the swelling of laminated phenol-formaldehyde plastics containing respectively as base materials, fibre glass fabric, asbestos paper, and asbestos fabric, which are suitable for making meter pistons. It will be seen that in each of these samples the increase of length not only is considerably less than any of the examples previously described, but reaches its limit after a relatively short length of time and remains constant thereafter.

In Figure 3 I have plotted typical curves comparing the lineal increase in transverse and in lateral dimensions of various phenol-formaldehyde materials. Curves L and M represent the expansion of a molded phenol-formaldehyde plastic containing no filler and curves N and O represent the expansion of a similar plastic containing a comminuted filler. It will be seen that in these materials the per cent of swelling in thickness and in length is approximately the same, and the swelling does not become stabilized for a relatively long period of time, which may be as high as 28 days or longer. These materials are, therefore, unsatisfactory for meter pistons, which come into contact with water, especially hot water. Curves H and I represent respectively the lateral and transverse expansion of a laminated phenol formaldehyde plastic containing a base of asbestos paper. This particular material has a relatively small lateral expansion and a relatively great transverse expansion and, as shown by both curves, the swelling becomes stabilized after a relatively short period of time. This material is satisfactory for meter pistons where a large tolerance in thickness is permissible. Curves J and K represent the lateral and transverse swelling of a laminated phenol formaldehyde plastic containing a base of asbestos fabric. This material, which is particularly suitable for meter pistons, has a relatively small expansion in thickness and in length, the expansion in length being substantially the same as that for plastics made with asbestos paper.

In the accompanying drawing, Figure 1 illustrates a water meter piston of the nutating disc type made in accordance with the present invention. It comprises a circular disc 1 of a thermosetting phenol-formaldehyde plastic containing embedded therein a plurality of layers 2 of a woven asbestos cloth. A notch 3 is provided in the piston to accommodate the division plate usually provided in this type of meter. The presence of this notch in the disc appears to effect no warping or other change in the expansion properties of the disc when subjected to water. The half balls 4 preferably are made of baked graphite material, as this material is sufficiently durable, in the form of a massive ball. The half balls, however, may be made of any other suitable material.

While I have shown a piston for nutating disc meters by way of example, it will be understood that the invention is not limited to any particular type or shape of meter piston, nor necessarily to a meter used exclusively for measuring water. For example, a gasoline meter piston may be made in accordance with the present invention, as gasoline frequently contains small quantities of water, and the material selected for a gasoline meter piston therefore should be water resistant. A piston made in accordance with the present invention is resistant to gasoline.

What I claim and desire to secure by United States Letters Patent is:

1. A piston for a liquid meter, comprising a disc composed of a non-metallic fibrous base material in the form of cohesive sheets which is substantially unaffected by water and lying in the plane of the disc, embedded in a thermosetting phenolic resin, said piston when exposed to water having a smaller co-efficient of swelling in the plane of lamination than in the thickness.

2. A piston for a water meter comprising a disc composed of sheets of woven asbestos cloth lying in the plane of the disc and embedded in a thermosetting phenolic resin, said piston when exposed to water having a smaller co-efficient of swelling in the plane of lamination than in the thickness.

3. A piston for a water meter comprising a disc composed of sheets of asbestos felt lying in the plane of the disc and embedded in a thermosetting phenolic resin, said piston when exposed to water having a smaller coefficient of swelling in the plane of lamination than in the thickness.

4. A piston for a water meter comprising a disc composed of sheets of woven glass fiber cloth lying in the plane of the disc and embedded in a thermosetting phenolic resin, said piston when exposed to water having a smaller coefficient of swelling in the plane of lamination than in the thickness.

REGINALD L. WAKEMAN.